DEVICE FOR THE MAGNETIC ALIGNMENT OF MAGNETIC TAPE

Filed July 18, 1963 3 Sheets-Sheet 1

INVENTORS

M. C. VEREYCKEN &
S. R. LAMBEIR

BY Homer R. Montague
ATTORNEY

DEVICE FOR THE MAGNETIC ALIGNMENT OF MAGNETIC TAPE

Filed July 18, 1963

INVENTORS

M. C. VEREYCKEN &
S. R. LAMBEIR

BY Homer R. Montague
ATTORNEY

INVENTORS
M. C. VEREYCKEN &
S. R. LAMBEIR
BY Homer R. Montague
ATTORNEY

United States Patent Office 3,354,416
Patented Nov. 21, 1967

3,354,416

DEVICE FOR THE MAGNETIC ALIGNMENT OF MAGNETIC TAPE

Modest Charline Vereycken, Schelle, and Silvaan René Lambeir, Bonheiden, Mechlin, Belgium, assignors to Gevaert Photo-Producten N.V., Mortsel-Antwerp, Belgium, a company of Belgium Filed July 18, 1963, Ser. No. 296,425
Claims priority, application Belgium, July 25, 1962, 41,844, Patent 620,612
8 Claims. (Cl. 335—284)

ABSTRACT OF THE DISCLOSURE

An arrangement for magnetically aligning magnetic recording tapes, especially in a direction transverse to the length of the tape, by means of currents flowing in coil windings whose geometry provides a transverse aligning field from coil sections closely adjacent the tape surface and paralleling its length, and which sections are interconnected by transverse coil sections passing around the edges of the tape so that tape motion does not interfere with the windings.

The present invention relates to a device for the magnetic alignment of magnetic tape. By magnetic alignment of magnetic tape is understood the technique consisting in subjecting the wet coat to a magnetic field, the configuration of which tends to align all the oxide particles and agglomerates in the plane of the web and parallel to a given direction.

More particularly the present invention relates to a device for the transverse alignment of the magnetic particles of magnetic tape intended for use in recording apparatus in which the recording occurs in the transverse direction of the magnetic tape e.g. in apparatus for recording video signals, in which a rotating head assembly traces tracks which are directed practically normally to the direction in which the magnetic tape travels.

A device for the transverse alignment of magnetic tape is known from the published German patent application 1,088,729. This device consists of a permanent or electromagnetic coil provided with two poleshoes between which the magnetic tape to be aligned is passed.

This device, however, shows the disadvantage that a sufficient field strength for the alignment can only be obtained over narrow tape widths (some inches).

The object of the present invention is to provide a device for a transverse alignment of magnetic tape which allows the production of high field strengths over large tape widths. By large tape widths has to be understood in the present case, widths of tapes in order of magnitude of 300 to 1200 mm.

Another object of the present invention is to provide a device for the alignment of magnetic tape which allows one to produce an aligning magnetic field the direction of which can be adjusted arbitrarily from 0 to 90° relative to the longitudinal direction of the magnetic tape.

Still another object of this invention is to provide a device for the alignment of magnetic tape which is fed by electric impulses.

With reference to the accompanying drawings, the invention will now be illustrated by way of some examples.

FIGS. 1 to 4, which are only given for clearness' sake, schematically indicate how starting from a normal coil with rectangular cross-section, in a few successive stages a coil can be obtained which complies with the characteristics of the present invention.

Figure 1:
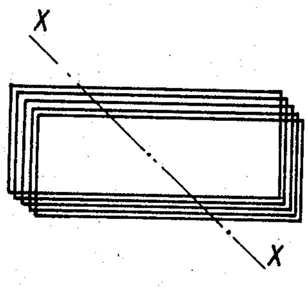
FIGS. 1 to 4 show schematically how a device according to the present invention can be obtained in successive stages starting from a coil with rectangular cross-section.
Figure 2:
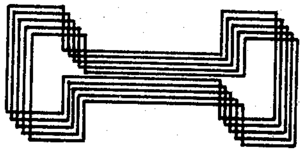

By partly pressing the longitudinal sides of the coil represented in FIG. 1, the coil is deformed into a coil the windings of which are shaped as shown in FIG. 2. The windings of both end parts, i.e. the short dimensioned parts of the coil, are divided into two equal parts and are directed respectively to the right and to the left in such a way as to obtain a coil as represented by the top view of FIG. 3.

Figure 3:
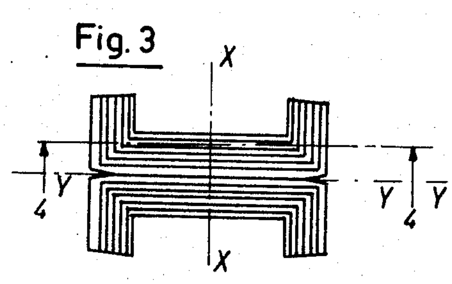
Figure 4:
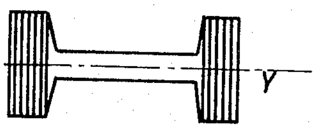

FIG. 4 is the cross-section of the coil on line 4—4 of FIG. 3.

X—X indicates the direction of the magnetic field produced by the coil, whereas Y—Y indicates the direction according to which the magnetic tape to be aligned is passed through the coil.

By "coil extremities" is understood the sidelong bent parts of the coil along which the magnetic tape is passed in or out of the coil.

Figure 5:
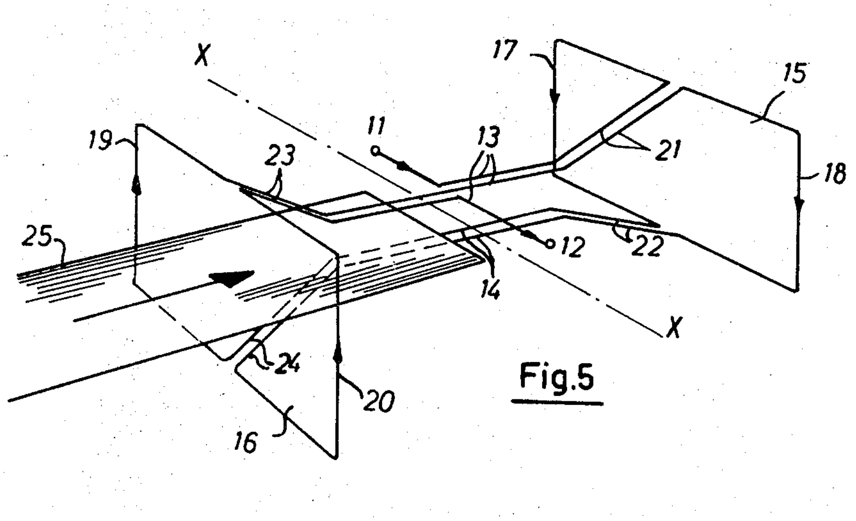
FIG. 5 represents schematically the current flow in the device.

FIG. 5 represents schematically the electrical current flow in the coil. From the terminal 11 a D.C. is conducted through the part 13 being parallelly positioned with respect to the magnetic tape, the diverging part 21, the left hand part 17 of the extremity 15, the diverging part 22, the part 14 running parallel to the magnetic tape, the diverging part 24, the left hand part 19 of the extremity 16 and the diverging part 23, to the part 13 of the following winding. In this way the electrical current flow in the left hand part of the coil is completed. The electrical current flow in the right hand part of the coil is conducted from the part 13 parallel with the magnetic tape over the diverging part 21, the right hand part 18 of the extremity 15, the diverging part 22, the part 14 running parallel to the magnetic tape, the diverging part 24, the right hand part 20 of the extremity 16, the diverging part 23 and the part 13 of the following winding to the terminal 12.

It is clear that the coil produces a magnetic field which is directed parallel to X—X. The magnetic tape 25 is passed through the coil in the direction indicated by the arrow.

By the central parts 13 and 14 of the coil, positioned at a small distance above and under the magnetic tape and extending over the full width of the magnetic tape, a magnetic field of sufficient strength is produced over the full width of the magnetic tape in the gap through which the magnetic tape is passed.

As the diverging parts 21, 22, 23 and 24 lie in one plane which is moreover directed normally to the plane of the magnetic tape and is running in the longitudinal direction of the magnetic tape, a magnetizing field is produced by the magnetic fields of these diverging parts, which is exclusively directed transversely with respect to the magnetic tape.

The parts of the windings incorporated in the coil extremities 15 and 16, on the contrary, have such a positioning and current direction that they produce magnetizing components the direction of which deviates from the transverse direction of the magnetic tape. Said winding parts, however, are located at such a great distance from the magnetic tape that the influence of their magnetic fields on the magnetic tape is negligible.

From the described coil configuration its results that the magnetic tape is exclusively aligned in the transverse direction and that no aligning action in any other direction occurs.

In the embodiment represented by the FIGS. 6 to 9, the magnetic tape can be aligned at an angle which is arbitrarily variable between 0 and 90° with respect to the longitudinal direction of the magnetic tape.

Figure 6:
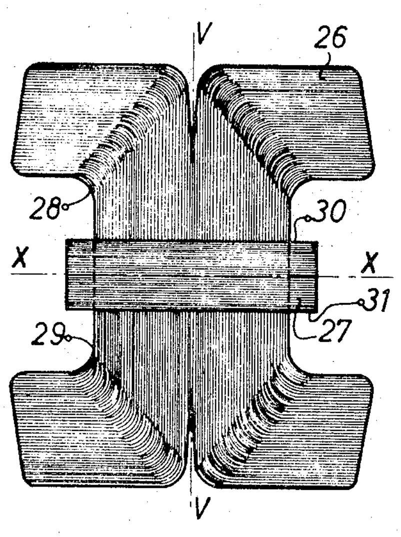
FIG. 6 is a top view.

As represented in FIG. 6, the device comprises a coil 26 of the type illustrated in FIGS. 1 to 5, and a normal cylindrical coil 27 which is positioned in such a way over the central part of this coil that the axis V—V of the coil 27 coincides with the direction of movement Y—Y (see the direction Y—Y in FIG. 3) of the magnetic tape through the coil 26.

Figure 7:
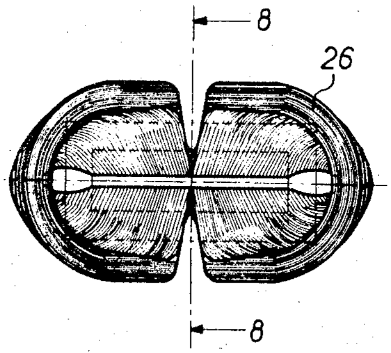
FIG. 7 is a front view.
Figure 8:
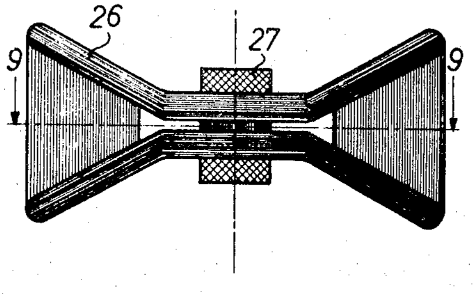
FIG. 8 is a cross-sectional view on line 8—8 of FIG. 7.
Figure 9:
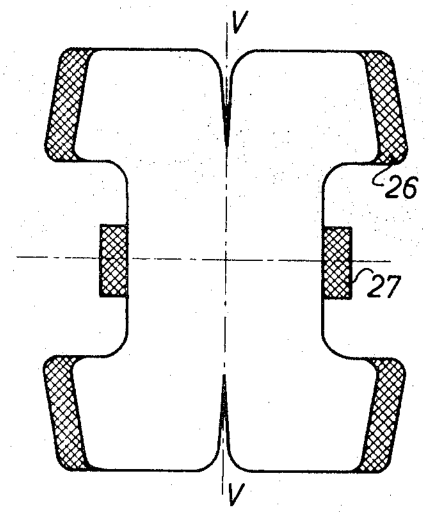
FIG. 9 is a cross-sectional view on the line 9—9 of FIG 8 of a first embodiment of the device according to the present invention.

FIG. 7 is a front view showing the same combination of coils, FIG. 8 is a cross-section on line 8—8 of FIG. 7 and FIG. 9 is a cross-section on line 9—9 of FIG. 8.

Figure 10:
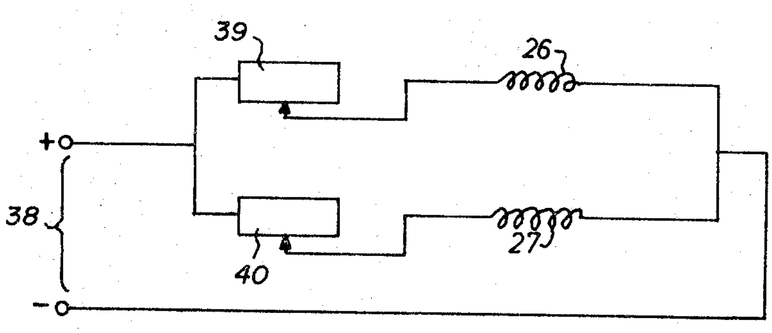
FIG. 10 shows a diagram of the electrical control circuit for the device according to FIGURES 6 to 9.

Both coils are connected to an appropriate feeding apparatus which is diagrammatically represented in FIG. 10. This feeding apparatus comprises a D.C. source 38 and two variable resistors 39 and 40. With resistor 39 the current in the coil 26 and with the resistor 40 the current in the coil 27 can be regulated. By a right choice of the ratio between both currents, it is possible to adjust the direction of the magnetizing field to each desired value between 0 and 90°.

The device according to the FIGS. 6 to 9 is particularly interesting for aligning magnetic tapes wherein the recording tracks are positioned obliquely in respect of the longitudinal direction of the magnetic tape, such as e.g. in the recently developed apparatus for recording video signals wherein the magnetic tape is passed loop-wise around a drum inside which a magnetic head is rotating.

Figure 11:
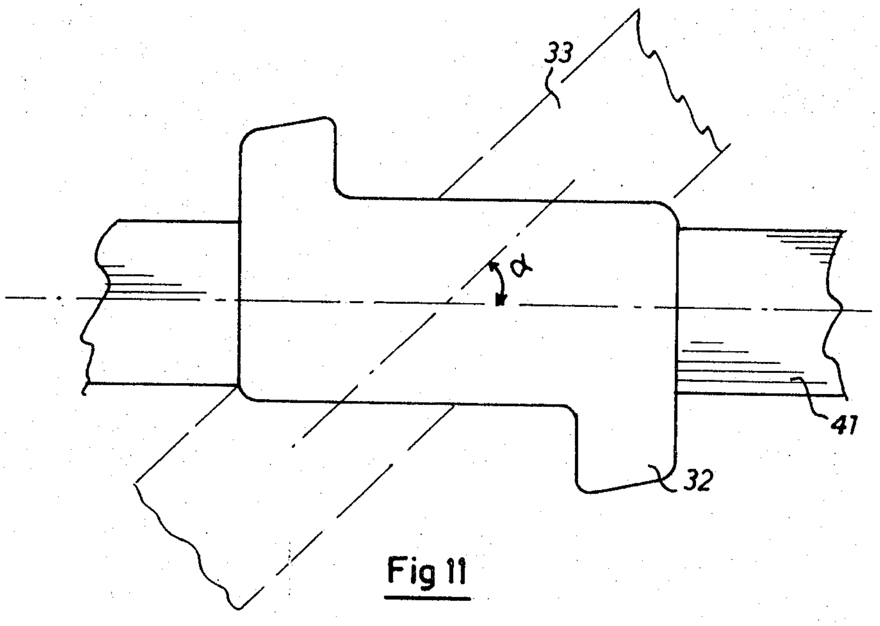
FIG. 11 is a second embodiment of the device according to the present invention.

FIG. 11 represents another embodiment of the device according to the present invention, wherein both coil extremities are not deflected to the left and to the right into two equal groups of windings, but wherein one extremity is entirely deflected to the left and the other entirely to the right.

A first magnetic tape 41 which is passed through the coil 32 is aligned at an angle of 90° relative to the longitudinal direction. A second magnetic tape 33, which is passed at an angle $\alpha$ relative to the magnetic tape 41 through the coil 32, is aligned at the angle $90°-\alpha$.

It is evident that the same effect is also attained by turning the coil 32 with respect to the magnetic tape. Also with this device, the direction of the magnetic field can be varied continuously between 0 and 90°.

As a variant of this device use can be made of two such coils, positioned one over the other at an angle of 90° and being each at an angle of 45° with respect to the longitudinal direction of the magnetic tape.

When the currents flowing through both coils are equal, the aligning magnetic field can be changed from the longitudinal direction of the magnetic tape to the transverse direction or vice versa by changing the direction of the current in one of the coils. Finally by using mutually differing currents, it is possible, as already described hereinbefore, to adjust the direction of the magnetizing field at any desirable angle between 0 and 90°.

For feeding the device according to the present invention a pulsating D.C. can be used instead of a normal D.C. As an advantage thereof has to be cited that less power must be applied to the device and that the feeding may be done by means of a normal, monophase rectified A.C. When the time interval between two subsequent impulses remains smaller than the time needed by the magnetic tape for passing through the central part of the coil, then the desired aligning is obtained exactly. From practical experience it has been observed that the pulsating current is not detected when reproducing the tape thus aligned.

The described devices can be used in the manufacture of magnetic recording material according to any of the known techniques such as the coating of a magnetic dispersion, the coating under vacuum, electrostatic spraying, extrusion of magnetic paste, etc.

The aligned magnetic material can, if desired, be submitted to mechaincal after-treatments such as buffing and calendering of the tape surface, after-stretching in the longitudinal direction, etc.

We claim:

1. Magnetic aligning device for magnetic tape, consisting of at least one electromagnetic coil through which the magnetic tape is continuously passed, each winding of said electromagnetic coil comprising at least two parts that extend at either side closely and parallel to the magnetic tape, and that both pass at their ends into diverging parts, said diverging parts being situated with said parallel parts in planes that are normal to the plane of the magnetic tape, and being in pairs mutually connected by means of loops beside the magnetic tape.

2. Magnetic aligning device according to claim 1, wherein the ends of the electromagnetic coil at the entrance end and the outlet end of the coil are each divided into two equal groups of windings which are deflected to the left and to the right, and which are passed aside of the magnetic tape.

3. Magnetic aligning device according to claim 1, wherein one end of the coil is deflected to the left and the other end is deflected to the right, and both ends are passed aside of the magnetic tape.

4. Magnetic aligning device according to claim 1, wherein the part of the coil, the windings of which are running closely parallel to the plane of the magnetic tape, has a width which is at least equal to the width of the magnetic tape to be aligned.

5. Magnetic aligning device according to claim 4, wherein the height of the said part of the coil amounts only to a fraction of its width.

6. Magnetic aligning device according to claim 2, wherein over the part of the coil the windings of which are running closely parallel to the plane of the magnetic tape, a second coil is positioned the axis of which is normal to the axis of the first coil and is situated in the plane of the magnetic tape.

7. Magnetic aligning device according to claim 1, wherein said device is fed by a pulsating direct current.

8. Magnetic aligning device according to claim 7, wherein said pulsating direct current is a monophase rectified alternating current.

References Cited

UNITED STATES PATENTS 3,162,792 12/1964 Hackley et al. _______ 335—284

BERNARD A. GILHEANY, *Primary Examiner.*

G. HARRIS, *Assistant Examiner.*